United States Patent [19]

Orain

[11] 4,115,022

[45] Sep. 19, 1978

[54] COUPLINGS HAVING SLIDING SPLINES

[75] Inventor: Michel A. Orain, Conflans-Sainte Honorine, France

[73] Assignee: Glaenzer Spicer

[21] Appl. No.: 795,556

[22] Filed: May 10, 1977

[30] Foreign Application Priority Data

May 17, 1976 [FR] France .................. 76 14813

[51] Int. Cl.² ............................................. F16D 1/10
[52] U.S. Cl. ................................ 403/359; 192/108; 192/114 T
[58] Field of Search ..................... 192/108, 114 T; 403/359

[56] References Cited

U.S. PATENT DOCUMENTS

| | | | |
|---|---|---|---|
| 2,070,140 | 2/1937 | Peterson et al. .............. | 192/114 T |
| 2,821,277 | 1/1958 | Hughes .......................... | 192/114 |
| 2,874,817 | 2/1959 | Altmann ........................ | 192/114 T |
| 2,942,712 | 6/1960 | Altmann ........................ | 192/114 T |
| 3,249,188 | 5/1966 | Maina ............................ | 192/108 |
| 3,265,173 | 8/1966 | Russell .......................... | 192/108 |
| 3,290,918 | 12/1966 | Weasler ......................... | 403/359 |

*Primary Examiner*—Werner H. Schroeder
*Assistant Examiner*—Conrad L. Berman
*Attorney, Agent, or Firm*—Wenderoth, Lind & Ponack

[57] ABSTRACT

At least one of the splined members of the splined coupling has its splines modified so that they have maximum thickness in an intermediate part of the splines and progressively decrease to the ends of the splines. The resulting profile is such that, upon application of a given torque, the pressure produced in the zones of contact between the interengaged splines is substantially constant throughout the interengaged length of the splines.

7 Claims, 3 Drawing Figures

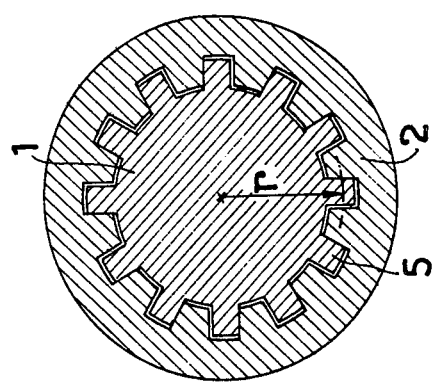
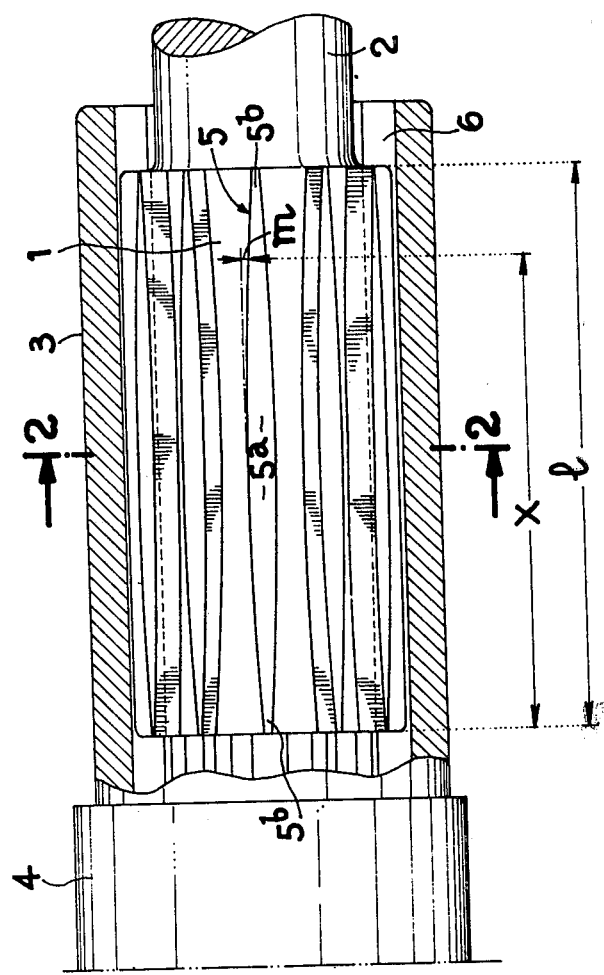

COUPLINGS HAVING SLIDING SPLINES

The present invention relates to couplings having sliding splines, such as those which are in particular employed in homokinetic or quasi-homokinetic joints in automobile vehicles.

It has been observed in sliding-splines couplings of conventional construction which must operate under torque that there is a wear which may result in seizing and is always localized at the ends of the engaging splines. This is due to the fact that the pressures produced under torque upon contact between the splines are maximum in the vicinity of the ends of these splines and zero in a great length of the central part. This is due mainly to the fact that the two engaged elements, namely the male and female elements, do not have constant torsion capacities throughout their length, this capacity to deform under torsion being maximum in the vicinity of the end of each member the most remote from the shaft to which it is connected. In an attempt to reduce these very great pressure points which appear at the ends of the engaged splines it has already been proposed to coat the splines with plastics materials such as "Rilsan" or "Nylon" which have beneficial effects not only on the distribution of the pressures but also on the reduction of the coefficient of friction. However, even by employing such coatings, there are nonetheless high pressure points at the ends of the zones in contact, whereas the central region of the bearing of the sides of the splines transmits no useful thrust. Sooner or later there is consequently also wear and possibly a seizing.

An object of this invention is to provide a splined coupling which does not have this drawback and consequently has a prolonged life and an improved stability owing to a decrease in the wear in the end zones of the splines.

For this purpose, the splines of at least one of the engaged members, namely the male and female members, has splines whose thickness is maximum in an intermediate part and progressively decreases to the ends, the profile being such that, upon application of a given torque, the pressure produced in the zones of contact between the splines is roughly constant throughout the length of the engaged splines.

Preferably, the modification of the profile is made on only one of the two members, preferably on the member having the shorter splines.

Another object of the invention is to provide a method for producing an improved splined member according to the invention. This method comprises preparing a blank of the member by a conventional method, namely machining, cold drawing or rolling, said blank being made from a metal having a suitable malleability, for example in the annealed state, bringing this blank into engagement with a tool which is much harder and has substantially the shape of the complementary member of the splined coupling, and exerting between the blank and the tool a torque which is sufficient to achieve a suitable deformation of the blank, said torque being, if desired, exerted in succession in one and then in the other direction so as to effect a shaping on both sides of the splines.

The invention will now be described with reference to an embodiment which is given solely by way of example with reference to the drawings in which:

FIG. 1 is a diagrammatic view of an improved coupling according to the invention, the female member being in side elevation and in section;

FIG. 2 is a cross-sectional view of the coupling, and

Figure 3:
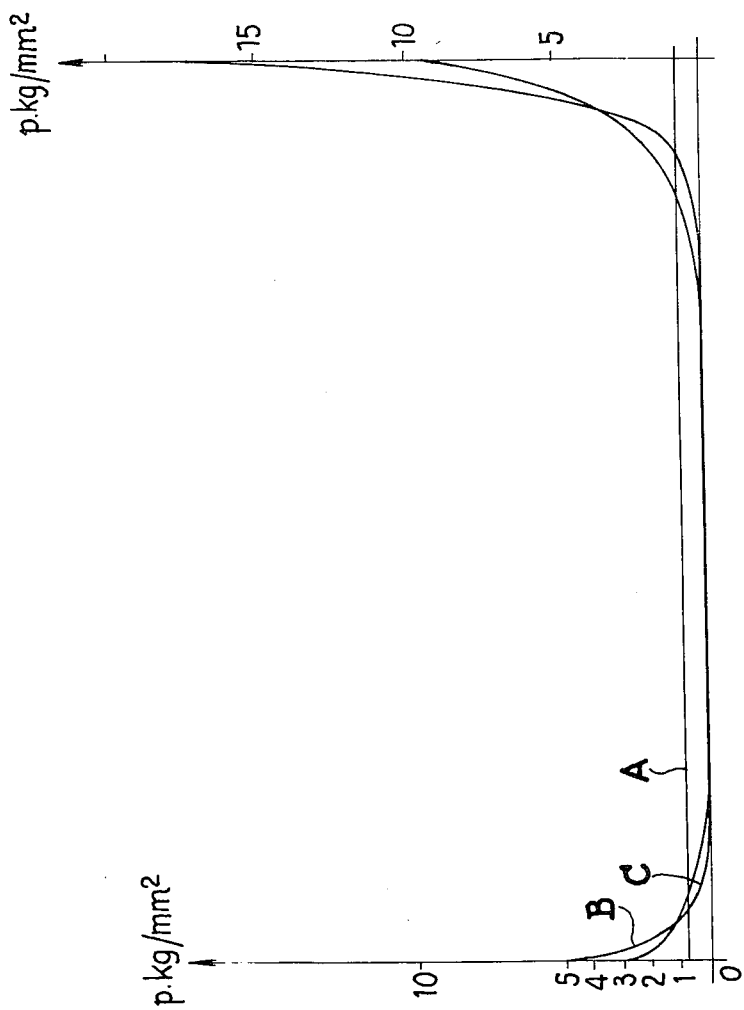
FIG. 3 is a graph comparing the known solution with the solution according to the invention.

FIGS. 1 and 2 show a splined coupling comprising a splined male member 1 rigid with a shaft 2 and a splined female member 3 constituting a sleeve connected to a second shaft 4. It will be assumed that the shaft 2 is the driving shaft, which leads to giving to the splines 5 rigid with this shaft a length less than the length of the splines 6 rigid with the other shaft.

In the illustrated embodiment, the sides of the splines of the female member are rectilinear and the splines 5 of the male member are profiled in accordance with the invention in such manner as to obtain a substantially equal distribution of the pressures throughout the engaged length of the splines. The splines 5 have a maximum thickness in the median part $5^a$ thereof, and the thickness progressively decreases to the two ends $5^b$. It will be understood that the magnitude of the variation in the thickness has been considerably exaggerated in the drawing.

The value of the dimension $m$ which represents the correction of the profile with respect to a rectilinear and planar profile along the mean line of a side of a spline, as a function of the distance X to one end of the splines, is given, preferably, by the following formula:

$$m = \frac{Cr}{GlI_f}\left[-\frac{l^2}{2(\frac{I_f}{I_a}+1)} - \frac{x^2}{2}(\frac{I_f}{I_a}+1)+lx\right] \quad (1)$$

or in inserting $$U = \frac{I_f}{I_a} + 1$$

$$m = \frac{CrlU}{2GI_f}(\frac{1}{U} - \frac{X}{l})^2 \quad (2)$$

Moreover, if $I_a = I_f$ the formula (1) becomes:

$$m = (X - \frac{l}{2})^2 \cdot \frac{C \cdot r}{G \cdot l \cdot I} \quad (3)$$

The value of $m$ is calculated from a formula giving the value of $\lambda$, deformation of the spline at the considered point under a nominal torque C.

$$m = \lambda_{max} - \lambda_x \quad (4)$$

$$\lambda = \frac{C \cdot r}{G \cdot l}\left[\frac{X^2}{2}(\frac{1}{I_a}+\frac{1}{I_f}) - \frac{l \cdot X}{I_f}\right] \quad (5)$$

$$\lambda_{max} = -\frac{Cr}{G \cdot l} \cdot \frac{l^2}{2I_f(\frac{I_f}{I_a}+1)} \quad (6)$$

In these formulae:

$r$ is the load radius, or the distance between the mean line of the side of the spline and the axis of the corresponding shaft;

$G$ is the modulus of elasticity in torsion of the member in the considered section;

$l$ is the engaged length of the splines;

$I_a$ is the polar inertia of the section for the male member;

$I_f$ is the polar inertia of the section for the female member.

These different characteristic magnitudes are conventional and have therefore not been defined in more detail.

Bearing in mind the manner in which the profile of the sides of the splines is calculated, when the coupling operates under a normal torque, the differential torsion of the members 1 and 2 in their different sections results, in the region of the surfaces of contact between the sides of the splines, in a pressure which is roughly constant throughout the engaged length $l$ of the splines. It will be understood that, if the torque varies, this pressure is no longer constant but its variation remains small if it is compared with the pressure points observed with splines having a conventional profile. In any case, if the nominal torque corresponds to the maximum torque, the pressure is higher in the intermediate zone of the splines and the distribution of the pressures is improved over that of the prior art.

FIG. 3 shows a graph illustrating the preceding paragraph:

The straight line A represents the value of the pressure at the contact of the two sides of splines profiled in accordance with the invention, the curves B and C represent the values of this pressure in the case of conventional profiles respectively without (curve B) and with (curve C) a coating of antifriction material. On the curves B and C, the pressure points at the ends of the splines are clearly visible whereas the pressure is zero in the major part of the length.

Note also that the improvement of the invention must be very clearly distinguished from a known technique termed "crowning" which consists, in particular in the machining of certain gear members, cutting a short length of the end zones of the teeth thinner and thereby avoiding splintering in the zones under the effect of Hertz pressures. The problems to be solved and solutions envisaged are indeed of a quite different type.

The table below gives by way of a numerical example applied to a coupling having rectilinear splines, the values of $m$ as a function of U and X.

The chosen numerical values are the following:
$I_f = 671\,421\ mm^4$
$r = 20\ mm$
$l = 150\ mm$
$G = 8,000\ kg/mm^2$
$C = 400,000\ mm/kg$.

TABLE

| X in mm | 0 | 0 | 0 | 30 | 50 | 75 | 150 | 150 | 150 |
|---|---|---|---|---|---|---|---|---|---|
| U | 5 | 3 | 2 | 5 | 3 | 2 | 5 | 3 | 2 |
| m in mm | 0.0223 | 0.037 | 0.055 | 0 | 0 | 0 | 0.357 | 0.149 | 0.055 |

It is found that, as a function of the value of U, that is to say the ratio $I_f/I_a$, the abscissa of the point for which $m = 0$ varies in a substantial manner.

Moreover, in the preceding formulae, it was assumed that the polar inertia $I_a$ and $I_f$ of the two members were constant throughout the length of the engaged splines. If at least one of the inertias varies as a function of the abscissa in a linear or a non-linear manner, this of course will have to be taken into account in the determination of the correction $m$ of the profile.

If the two sets of splines have a modified profile, the sum of the dimensions $m_a$, $m_f$ representing the corrections with respect to the basic profiles of the male member and female member, is equal to the dimension $m$ such as calculated by the preceding formulae (1), (2) and (3).

This correction is applicable irrespective of the shape of the splines, which may be planar or non-planar.

A preferred method for producing such a splined member is the following: a blank of a splined member is first formed from a relatively malleable steel, for example in the annealed state, by a conventional method: machining, drawing or rolling for example. In the chosen example, this member is the male member. A tool is employed to which there is given the shape of the complementary member, namely the female member, this tool being of a hardened steel having a very high surface hardness.

The blank is introduced into the hardened steel tool and the assembly is driven in rotation while a radial force is applied at a certain distance from the splined length so as to exert a bending moment on the splined connection. Simultaneously, a torsional torque is applied to the shaft of the plunger so as to reach the nominal torque of use. The combined action of the bending moment and the torque during rotation progressively shapes the teeth and the axis of the shaft of the plunger becomes dissaligned to the extent that it makes an angle $\epsilon$ with the axis of the shaping tool, this angle, which is of the order of a few minutes, being such that the calculated value of $m$ is obtained.

This operation is thereafter recommenced with an equal torque in the opposite direction so as to shape the other sides of the splines. If desired, the plunger shaft may be hardened before use or may undergo any other treatment to impart the necessary strength thereto. In the case of shaping an annealed steel plunger, it may be desirable to effect the longitudinal profiling operation on a plunger whose shaft has the same diameter as the outside diameter of the splines so as to be able to apply sufficient torque. Thereafter, if necessary, the diameter of the shaft is reduced by a turning operation.

The same shaping principle may of course be applied for shaping the inner splines of the sleeve if the compensation is effected on the splines of the sleeve.

It will be clear that the profile of the splines is determined to take into account clearances required for the sliding and the fact that at least one of the two members may be, if desired, coated with an antifriction material.

Furthermore, it may be required to provide at the free end of the female member or sleeve a cap which provides a perfect guiding between the two members while performing the functions of sealing the coupling and retaining the members to prevent separation thereof.

Having now described my invention what I claim as new and desire to secure by Letters Patent is:

1. A coupling device comprising a male splined member and a female splined member having the splines thereof interengaged, the splines of at least one of said members being modified and having a thickness which is maximum in an intermediate part of the splines and progressively decreases to ends of the splines, the profile of the splines of said one of said members being such that, upon application of a given torgue, the pressure produced in the zones of contact between the interengaged splines is substantially constant throughout the interengaged length of the splines.

2. A device as claimed in claim 1, wherein, if C designates the applied torque, $r$ the load radius, G the modulus of elasticity in torsion of the considered member, $l$ the engaged length of the splines, $I_a$ the polar inertia of the section of a male member, $I_f$ the polar inertia of the female member, the dimension $m$ representing the correction of the profile as a function of the distance X to one end of the splines in the region of the mean line of the side of the spline, is given by the following formula:

$$m = \frac{Cr}{GlI_f}\left[-\frac{l^2}{2(\frac{I_f}{I_a}+1)} - \frac{x^2}{2}(\frac{I_f}{I_a}+1) + lx\right] \quad (1)$$

3. A coupling device as claimed in claim 2, wherein the formula (1) becomes $$m = \frac{CrlU}{2GI_f}(\frac{l}{U} - \frac{X}{l})^2 \quad (2)$$

if there is substituted $$U = \frac{I_f}{I_a} + 1.$$

4. A device as claimed in claim 2, wherein if the two members have the same inertia:

$$m = (X - \frac{l}{2})^2 \cdot \frac{C \cdot r}{G \cdot l \cdot I} \quad (3)$$

5. A device as claimed in claim 1, wherein solely the splines of the member having the shorter splines are modified.

6. A device as claimed in claim 1, wherein the profiles of the splines of both members are modified, the sum of the corrections $m_a + m_f$ being roughly equal, in each section, to the chosen total correction $m$.

7. A device as claimed in claim 1, comprising sliding guide means located at a distance from the engaged splines to ensure a perfect guiding of the splines.

* * * * *